United States Patent
Kling et al.

(10) Patent No.: US 8,030,870 B2
(45) Date of Patent: Oct. 4, 2011

(54) METHOD AND DEVICE FOR REDUCING THE INFLUENCE OF A DC COMPONENT IN A LOAD CURRENT OF AN ASYNCHRONOUS THREE-PHASE MOTOR

(75) Inventors: Daniel Kling, Västerås (SE); Gunnar Johansson, Skultuna (SE)

(73) Assignee: ABB AB (SE)

( * ) Notice: Subject to any disclaimer, the term of this patent is extended or adjusted under 35 U.S.C. 154(b) by 287 days.

(21) Appl. No.: 12/402,275

(22) Filed: Mar. 11, 2009

(65) Prior Publication Data

US 2009/0174360 A1    Jul. 9, 2009

Related U.S. Application Data

(63) Continuation of application No. PCT/SE2007/050603, filed on Aug. 31, 2007.

(30) Foreign Application Priority Data

Sep. 11, 2006 (SE) ........................ 0601861

(51) Int. Cl.
*H02K 23/00* (2006.01)
(52) U.S. Cl. .................... 318/437; 318/812; 318/772
(58) Field of Classification Search .................. 318/437, 318/812, 772, 786, 747, 801, 807; 363/43
See application file for complete search history.

(56) References Cited

U.S. PATENT DOCUMENTS

| | | |
|---|---|---|
| 3,497,796 A | 2/1970 | Konrad |
| 5,986,440 A | 11/1999 | Deschenes et al. |
| 6,930,459 B2 | 8/2005 | Fritsch et al. |
| 2004/0207352 A1* | 10/2004 | Fritsch et al. .............. 318/437 |

FOREIGN PATENT DOCUMENTS

| | | |
|---|---|---|
| DE | 102004038111 A1 | 2/2006 |
| GB | 2 403 855 A | 1/2005 |
| JP | 2001268958 A | 9/2001 |
| WO | 01/48903 A1 | 7/2001 |
| WO | 03/081962 A1 | 10/2003 |
| WO | 2006067093 A1 | 6/2006 |

OTHER PUBLICATIONS

Supplementary Partial European Search Report; EP 07 79 4208; Sep. 9, 2009; 12 pages.
International Search Report, Dec. 14, 2007, 4 pages.

* cited by examiner

*Primary Examiner* — Karen Masih
(74) *Attorney, Agent, or Firm* — St. Onge Steward Johnston & Reens LLC

(57) ABSTRACT

A method for reducing the influence of a DC component in a load current of an asynchronous three-phase motor, in which the voltages of two of the three phases are controlled by adjusting firing angles of semiconductor devices of the type turning-off at zero-crossing of the current therethrough comprises the steps carried out for each said controlled phase: detecting turn-off times of the semiconductor devices, calculating a value of a change of firing angle of the semiconductor devices needed for changing the length of the time period between two subsequent turn-off times for compensating for the influence of a DC component, and determining the firing angle of said semiconductor devices in dependence of the result of this calculation.

25 Claims, 2 Drawing Sheets

METHOD AND DEVICE FOR REDUCING THE INFLUENCE OF A DC COMPONENT IN A LOAD CURRENT OF AN ASYNCHRONOUS THREE-PHASE MOTOR

CROSS-REFERENCE TO RELATED APPLICATIONS

The present application is a continuation of pending International patent application PCT/SE2007/050603 filed on Aug. 31, 2007 which designates the United States and claims priority from Swedish patent application 0601861-8 filed on Sep. 11, 2006, the content of which is incorporated herein by reference.

FIELD OF THE INVENTION

The present invention relates generally to a method and an apparatus for reducing the influence of a DC component in a load current of an asynchronous three-phase motor.

BACKGROUND OF THE INVENTION

Starter devices for asynchronous three-phase motors comprising semiconductor devices for controlling the voltage applied to the motor in one, two or three of the phases by adjusting firing angles of semiconductor devices of the type turning-off at zero-crossing of the current therethrough, two connected in anti-parallel to each other in each phase, have been used for some time. By controlling said voltage in the respective phase a reduction of the torque and current provided to the motor is achieved during start and stop operation. The firing angle of the semiconductor devices is used for controlling the amount of energy supplied to the motor.

These types of starter devices, often called softstarters, are normally provided with three such pairs of semiconductor devices, such as thyristors. However, these semiconductor devices have become the cost-determining factor of such starter devices, so that such starter devices having only one pair of such semiconductor devices for two of the phases are also used. This means that the remaining third phase is in the form of a conductor, which cannot be switched. The present invention is occupied with this type of starter devices.

By adjusting the firing angles of the semiconductor devices in two of the three phases the voltage across the motor may be controlled from zero to 100% of the maximum voltage thereacross. This is done by changing the firing angle of the semiconductor devices, such as to reducing it for increasing said voltage. However, when the control takes place in only two of the phases, unwanted effects in the form of for example a DC component in the motor current appear. During start up operation a smooth and gradually increasing torque is desired, but this DC component appearing during start up sometimes creates a braking or oscillating torque. This can be both disturbing and damaging to the controller system, the electric motor, and to the motor driven load.

The present invention is directed to a method and an apparatus for reducing the influence of such a DC-component in a load current of an asynchronous three-phase motor, in which the voltages of two of the three phases are controlled according to the aforesaid. The invention is not restricted to such methods and apparatuses for any particular such electric motor with respect to the motor voltage, but 200-600 V may be mentioned as a typical motor voltage, or the power delivered by such a motor, which is often in the range of 1-30 kW. Nor is the present invention restricted to such motors for any particular type of load, but the motor may be used to drive all types of equipment, such as pumps, turning machines and the like.

U.S. Pat. No. 6,930,459 discloses a method and an apparatus for reducing the influence of a DC component in the load current of an asynchronous three-phase motor, in which the voltages of two of the three phases are controlled by adjusting the firing angles of semiconductor devices as described above. However, the methods described therein are rather complicated with respect to measurements and calculations. Turn-on as well as turn-off times of the different semiconductor devices have to be detected and considered during the calculations of how the firing angle of the semiconductor devices shall be changed for reducing the influence of a said DC component.

SUMMARY OF THE INVENTION

The object of the present invention is to provide a method and an apparatus of the type defined above, which makes it possible to efficiently and reliably obtain a reduction of the influence of a DC component in a load current of an asynchronous three-phase motor with less complexity than the approach described in the document mentioned above.

This object is according to the invention obtained by providing such a method, which further comprises the following steps carried out for each of said two controlled phases:
a) detecting the turn-off time of a first of said semiconductor devices and the subsequent turn-off time of the other, second semiconductor device,
b) determining the time period, called second time period, of the current half-cycle of said second semiconductor device as the difference between said two turn-off times,
c) calculating, based upon information about said second time period, a value of a change of firing angle of said first and/or second semiconductor device needed for changing the length of said second time period for compensating for the influence of any DC component of the current through this semiconductor device thereupon, and
d) determining the firing angle of said first and/or second semiconductor device in dependence of the result of said calculation for reducing the influence of a possible DC component in the current, as well as an apparatus according to the appended independent apparatus claim.

Thus, the invention is based on the idea to only detect the time of turning-off of the semiconductor devices for determining how much the firing angle of said first and/or second semiconductor device in one phase has to be changed for compensating for the influence of any DC component of the current through a certain of the semiconductor devices. This means that the time period of a so-called current half-cycle is utilized for detecting any DC-component of the current and the magnitude thereof, in which "the current half-cycle of a semiconductor device" here is defined as the time period starting from the turning-off of the semiconductor device connected in anti-parallel therewith and ending at the time of turning-off of this semiconductor device, so that it does not only include the time period of conduction of the semiconductor device, but also the time period during which a voltage is growing thereacross, which is the shorter the smaller said firing angle is. The determination of such current half-cycles is very easy to carry out accurately and reliably, and the invention only needs information about such a time period for determining the firing angle of a first and/or a second said semiconductor device for reducing the influence of a possible DC component in the current. Accordingly, although the length of said time period for said second semiconductor device is determined the firing angle may just as well be changed for the other, first semiconductor device, both semiconductor devices or only the second semiconductor device for compensating for the influence of said DC component, since any of these three options may result in a length of said time period towards an elimination of the influence of said DC component, which means a length thereof being half the time period of the voltage in said phase, which for a voltage having frequency of 50 Hz means 10 ms.

According to an embodiment of the invention said first and/or second time period is in said calculation step compared with half the time period of the voltage in said phase and the change of firing angle of said first and/or second semiconductor device needed for removing any difference between said second time period and said half time period of the voltage is calculated. The change of firing angle of said first and/or second semiconductor device needed for removing any difference between these time periods may easily be calculated making it possible to appropriately determining the firing angle of these semiconductor devices for reducing the influence of a possible DC component in the current.

According to another embodiment of the invention the method comprises the further steps of detecting the turn-off time of said first semiconductor device subsequent to a detection of the turn-off time of said second semiconductor device, and determining a time period, called first time period, of the current half-cycle of said first semiconductor device as the difference between the two turn-off times last mentioned, and said first and second time periods are compared in said calculation step and the change of the firing angle of said first and/or second semiconductor device needed for removing the difference between said first and second time periods is calculated. This is another simple and reliable option to obtain an efficient reduction of the influence of a DC component in the current, since this influence is removed when these two periods of time are equal, and they may both be controlled by the change of the firing angle for the respective semiconductor device.

According to another embodiment of the invention the method comprises the further steps of detecting the turn-off time of said first semiconductor device subsequent to a detection of the turn-off time of said second semiconductor device, and determining the time period, called first time period, of the current half-cycle of said first semiconductor device as the difference between the two turn-off times last mentioned, and the sum of said first and second time periods is used as a value for said half time period of the voltage in said phase in said calculation step. This means that it is not necessary to have knowledge about the frequency of the voltage for comparing said first or second time period with half the time period of the voltage in said phase for calculating a possible need of a change of firing angle for reducing the influence of any DC component in said current.

According to another embodiment of the invention the firing angle is determined using a definable correction factor. The use of such a correction factor may simplify a determination of the change of firing angle desired, and it may very well be selected so that the determination may result in a change of firing angle implying only a partial compensation of said influence in a first step, which will then be followed by further steps of compensation.

According to an embodiment of the invention the firing angle $\alpha(n)$ is in said determining step determined as follows:

$$\alpha(n)=\alpha_0-k_1(T_{(n-1)}-T_0)$$

in which n is the number of said current half-cycle, T is a said time period determined of a said current half-cycle, $T_0$ is half the time period of the voltage in said phase, $\alpha_0$ is the firing angle required for obtaining a desired voltage in said phase in absence of any DC component in the current and $k_1$ is said correction factor. The correction factor $k_1$ may then advantageously be 0.25-0.75, preferably about 0.5, rad/s. Information about the time period determined for a said current half-cycle and the time period of the voltage in said phase may in this way be used for determining the firing angle for the semiconductor device in the following current half-cycle.

According to another embodiment of the invention the firing angle $\alpha(n)$ is in said determining step determined as follows:

$$\alpha(n)=\alpha_0-k_2(T_{(n-1)}-T_{(n-2)})$$

in which n is the number of said current half-cycle, T is a said time period determined of a said current half-cycle, $\alpha_0$ is the firing angle required for obtaining a desired voltage in said phase in absence of any DC component in the current and $k_2$ is said correction factor. Said correction factor $k_2$ is then advantageously 0.125-0.375, preferably about 0.25, rad/s. A determination of said time periods in two subsequent current half-cycles without any knowledge about said time period of the voltage in said phase, i.e. the frequency of the voltage, is here enough for determining the firing angle of the semiconductor device in question.

According to another embodiment of the invention said firing angle is in said determining step d) determined to be changed by only a portion of said needed value of the change of the firing angle calculated in step d) for stepwise reducing the influence of any DC component of the current by repeating the steps a)-d) of the method. It may be suitable to gradually change the firing angle in this way for smoothly reducing said influence and avoiding to change the firing angle too much.

According to another embodiment of the invention the firing angle is in said determining step d) determined on the basis of at least two said calculations in step c) each following upon the steps a) and b). This measure also avoids making unnecessary changes of the firing angle owing to a random sudden influence upon the current in said phase.

According to another embodiment of the invention the method is carried out substantially continuously at least during the starting of said asynchronous motor until the voltage across the motor has reached a predetermined proportion of the maximum voltage thereacross, such as 80-100% of said maximum voltage, and according to another embodiment of the invention the method is carried out substantially continuously during at least a procedure of stopping said asynchronous motor until the voltage across said motor has at least been reduced to be below a predetermined value of the maximum voltage across the motor, such as 50-30% thereof.

Embodiments of the apparatus according to the invention are defined in the dependent claims, and the features and advantages thereof appear from the description above of corresponding method claims.

The invention also relates to a computer program as well as a computer readable medium according to the corresponding appended claims. The steps of the method according to the invention are well suited to be controlled by a processor provided with such a computer program.

Other advantageous features and advantages of the invention will appear from the following description.

BRIEF DESCRIPTION OF THE DRAWINGS

With reference to the appended drawings, below follows a specific description of embodiments of the invention cited as examples. In the drawings.

DETAILED DESCRIPTION OF THE INVENTION

Figure 1:
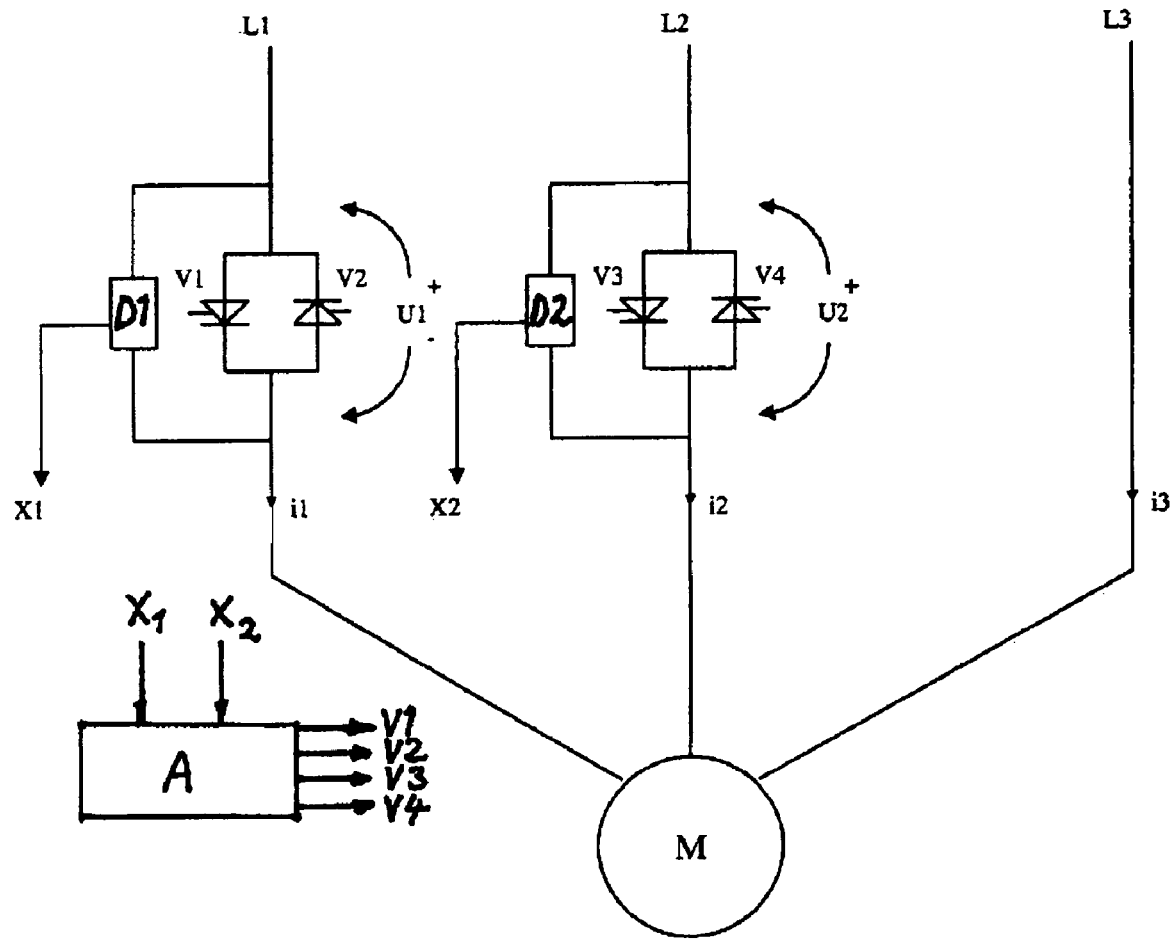
FIG. 1 shows a circuit diagram of the drive system for an asynchronous three-phase motor, in which the voltages of two of the three phases are controlled.

FIG. 1 shows the general construction of a so-called starter device for an asynchronous three-phase motor, in which an apparatus according to the invention may be arranged and to which a method for reducing the influence of a DC component in a load current according to the invention may be applied. It is shown how three phase lines L1, L2 and L3 are connected to a source of a symmetrical three-phase voltage (not shown) for feeding an electric three-phase asynchronous motor M. The three-phase source could be a main voltage or a three-phase created by means of a converter, so that the main voltage may in the latter case also be a direct voltage.

A pair of semiconductor devices V1, V2 and V3, V4, here thyristors, of the type turning-off at zero-crossing of the current therethrough, are connected in series to each of the lines L1, L2. The line L3 for the third phase is connected directly to the third phase terminal of the motor M.

The motor is associated with an arrangement A adapted to control said semiconductor devices by sending firing signals thereto, whereas they are turned off by zero-crossing of the current therethrough, so that the thyristors are switched between conducting and non-conducting states. This switching controls the voltage and the current provided to the motor M. The voltage created across these thyristors is U1 for the phase L1 and U2 for the phase L2, while the corresponding phase currents are indicated by i1 and i2.

A voltage measuring device D1 and D2 is connected in parallel with each thyristor pair. The measuring devices D1, D2 provide at their output a digital signal X1 and X2, respectively, representing the measured voltage U1 and U2, respectively as follows. When the voltage in question, such as U1, across the thyristors V1, V2 is essentially zero, i.e., either when at least one of the thyristors is conducting or during a zero-crossing of the phase voltage, then the signal X1 is a logical "1". In all other cases, i.e., when there is a voltage across the thyristors, the signal X1 is a logical "0". This signal X1 is forward to said arrangement A.

The operation of the motor will now be described with reference to FIGS. 2 and 3.

The signals X1 and X2 are used as references by the arrangement A for firing the thyristors, i.e. to make them conductive. The thyristors are fired at a firing angle α, which in FIGS. 2 and 3 is calculated from the negative edge of the respective signal X1, X2. The voltages across the motor terminals are adjusted by adjusting the firing angle α, and at a firing angle of 0°, i.e. with the thyristors conducting all the time, the motor voltage is 100% of the maximum voltage, with a firing angle of 90° the motor voltage is 50% of said maximum voltage and with a firing voltage of 180°, i.e. with the thyristors always non-conducting, the motor voltage is 0% of said maximum voltage. By gradually increasing or decreasing the firing angle α the voltage across the motor terminals is correspondingly adjusted.

Figure 2:
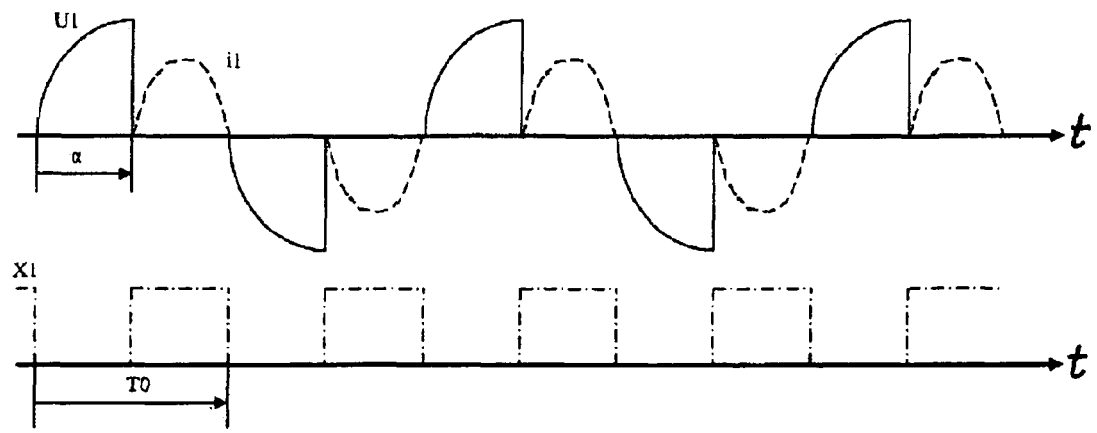
FIG. 2 is a graph of the voltage across the semiconductor devices of one phase of the drive system according to FIG. 1 and the current to the motor in this phase versus the time as well as a value being high when any of the semiconductor devices of that phase is conducting and otherwise low versus the time, for the case of no DC component in the load current of that phase.

FIG. 2 shows the case of no DC component present in the current i1, which means that the current time surface for the two thyristors V1 and V2 will be the same, and the period time $T_0$ of the reference signal X1 for this phase (and also X2 for the other phase) will be equal to half the time period of the voltage. With a frequency of 50 Hz $T_0$ equals 10 milliseconds.

Figure 3:
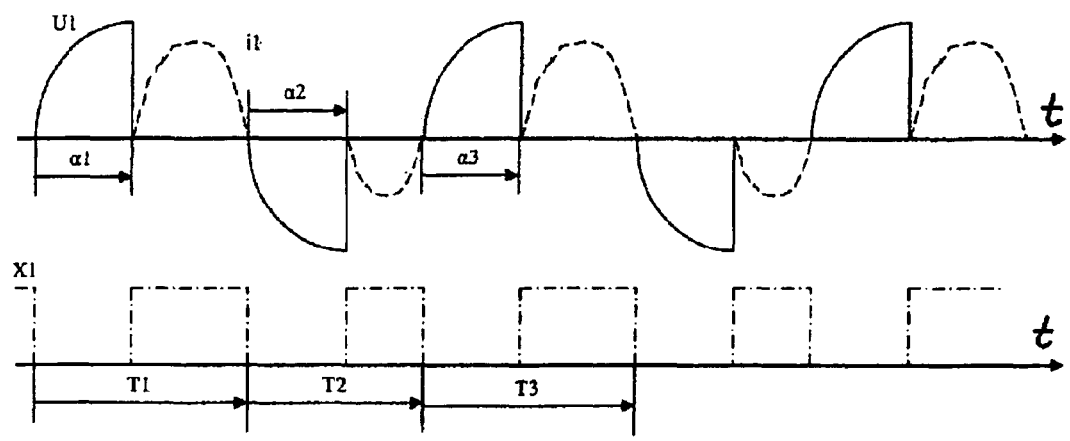
FIG. 3 is a graph of the voltage across the semiconductor devices of one phase of the drive system according to FIG. 1 and the current to the motor in this phase versus the time as well as a value being high when any of the semiconductor devices of that phase is conducting and otherwise low versus the time, for the case of a positive DC component in the load current of that phase.

It is shown in FIG. 3 what happens with the shapes of the voltage and current curves when a DC component appears. This is shown for the phase L1. It is shown how a positive DC component is added to the current i1, which means that the current time surface will be larger for the thyristor V1 than for the thyristor V2 connected in anti-parallel therewith. This also means that the current half-cycle T1, defined as the time period from the turning-off of the thyristor V2 to the time for turning-off of the thyristor V1, will be longer than the time period T2 of the current half-cycle of the thyristor V2. This also means that T1>T0, whereas T2<T0, where T0 is half the time period of the voltage in said phase. $\alpha_0$ is the firing angle required for obtaining a desired voltage in said phase in absence of any DC component in the current. The firing angle α is in this case equal for both positive and negative firings, i.e. $\alpha_0 = \alpha_1 = \alpha_2$, where $\alpha_0$ is the firing angle required for obtaining a desired voltage across the windings of the motor M.

The present invention aims at reducing the influence of such a DC component in the load current of the motor M. This is done by detecting the turn-off time of a first V2 of the semiconductor devices and the subsequent turn-off time of the other, second V1 semiconductor device, which is done by the device D1 delivering the signal X1. The time period of the current half-cycle of the semiconductor device V1 is then in said arrangement determined as the difference between said two turn-off times. After that, a calculation is carried out, based upon information about this time T1, of a value of a change of firing angle of said first V2 and/or second V1 semiconductor device needed for changing the length of the time period T1 for compensating for the influence of the DC component of the current through the semiconductor device V1. The firing angle of said first V2 and/or second V1 semiconductor device is then determined in dependence of the result of said calculation for reducing the influence of the DC component in the current. This means in the case illustrated in FIG. 3 that the firing angle $\alpha_1$ (or more exactly $\alpha_3$ or $\alpha_5$ or . . . according to the numbering used in FIG. 3) of the thyristor V1 shall be increased and/or the firing angle α2 (or $\alpha_4$ or $\alpha_6$ or . . . ) of the thyristor V2 shall be reduced.

With said calculation the time period T1 may be compared with the time T0, or the time T2 for the current half-cycle of the other thyristor may also be determined and T1 be compared with T2 or T1 or T2 be compared with the sum of T1 and T2, so that it will not be necessary to know T0.

The firing angles α1, α2, α3 and so on are then obtained by continuously correcting the firing angle $\alpha_0$ required for obtaining the desired voltage across the motor winding, so that the DC component will be compensated. This may then be done by using the following methods explained above:

$$\alpha(n) = \alpha_0 - k_1(T_{(n-1)} - T_0)$$

or $$\alpha(n) = \alpha_0 - k_2(T_{(n-1)} - T_{(n-2)})$$

$k_1$ and $k_2$ are correction factors defining the control amplification and $\alpha_0$ is the firing angle normally required for obtaining the desired voltage. Typical values for $k_1$=0.5 rad/s and $k_2$=0.25 rad/s. However, it is pointed out that the firing angles α may just as well be expressed as time periods, i.e. time periods from a turn-off time to next turn-on time, and the correction factors will then be dimensionless.

A reduction of the influence of the DC component in a load current of an asynchronous three-phase motor may by this be efficiently obtained in a very simple and reliable way. Such a method is preferably carried out during starting and stopping of the motor for reducing disturbances and risks of damaging the motor and loads connected thereto as a consequence of braking or oscillating torques.

The invention is of course not in any way restricted to the embodiments described above, but many possibilities to modifications thereof will be apparent to a person with ordinary skill in the art without departing from the basic idea of the invention as defined in the appended claims.

Although the control has above only been described for one phase the corresponding control procedure is in parallel thereto also carried out for the other controlled phase.

What is claimed is:

1. A method for reducing the influence of a DC component in a load current of an asynchronous three-phase motor, in which the voltages of two of the three phases are controlled by adjusting firing angles of semiconductor devices of the type turning off at zero-crossing of the current therethrough, two connected in anti-parallel to each other in each phase, characterized in that the method comprises the following steps carried out for each said controlled phase:
    a) detecting the turn-off time of a first of said semiconductor devices and the subsequent turn-off time of the other, second semiconductor device,
    b) determining the time period, called second time period, of the current half-cycle of said second semiconductor device as the difference between said two turn-off times,
    c) calculating, based upon information about said second time period, a value of a change of firing angle of said first and/or second semiconductor device needed for changing the length of said second time period for compensating for the influence of any DC component of the current through this semiconductor device thereupon, and
    d) determining the firing angle of said first and/or second semiconductor device in dependence of the result of said calculation for reducing the influence of a possible DC component in the current.

2. A method according to claim 1, characterized in that in said calculation step said first and/or second time period is compared with half the time period of the voltage in said phase and the change of firing angle of said first and/or second semiconductor device needed for removing any difference between said second time period and said half time period of the voltage is calculated.

3. A method according to claim 1, characterized in that it comprises the further steps of:
    detecting the turn-off time of said first semiconductor device subsequent to a detection of the turn-off time of said second semiconductor device, and
    determining a time period, called first time period, of the current half-cycle of said first semiconductor device as the difference between the two turn-off times last mentioned,
    and that in said calculation step said first and second time periods are compared and the change of the firing angle of said first and/or second semiconductor device needed for removing the difference between said first and second time periods is calculated.

4. A method according to claim 2, characterized in that it comprises the further steps of:
    detecting the turn-off time of said first semiconductor device subsequent to a detection of the turn-off time of said second semiconductor device, and
    determining the time period, called first time period, of the current half-cycle of said first semiconductor device as the difference between the two turn-off times last mentioned,
    and that in said calculation step the sum of said first and second time periods is used as a value for said half the time period of the voltage in said phase.

5. A method according to claim 1, characterized in that in said determining step d) the firing angle is determined using a definable correction factor.

6. A method according to claim 2, characterized in that in said determining step the firing angle $\alpha(n)$ is determined as follows:

$$\alpha(n)=\alpha_0-k_1(T_{(n-1)}-T_0)$$

in which n is the number of said current half-cycle, T is a said time period determined of a said current half-cycle, $T_0$ is half the time period of the voltage in said phase, $\alpha_0$ is the firing angle required for obtaining a desired voltage in said phase in absence of any DC component in the current and $k_1$ is said correction factor.

7. A method according to claim 6, characterized in that said correction factor is selected from a range of about 0.25 to about 0.75 rad/s.

8. A method according to claim 3, characterized in that in said determining step d) the firing angle $\alpha(n)$ is determined as follows:

$$\alpha(n)=\alpha_0-k_2(T_{(n-1)}-T_{(n-2)})$$

in which in which n is the number of said current half-cycle, T is a said time period determined of a said current half-cycle, $\alpha_0$ is the firing angle required for obtaining a desired voltage in said phase in absence of any DC component in the current and $k_2$ is said correction factor.

9. A method according to claim 8, characterized in that said correction factor $k_2$ is selected from a ranqe of about 0.125 to about 0.375, rad/s.

10. A method according to claim 1, characterized in that said firing angle is in said determining step d) determined to be changed by only a portion of said needed value of the change of the firing angle calculated in step d) for stepwise reducing the influence of any DC component of the current by repeating the steps a)-d) of the method.

11. A method according to claim 1, characterized in that the firing angle is in said determining step d) determined on the basis of at least two said calculations in step c) each following upon the steps a) and b).

12. A method according to claim 1, characterized in that it is carried out substantially continuously at least during the start of said asynchronous motor until the voltage across the motor has reached a predetermined proportion of the maximum voltage thereacross, selected from a range of about 80% to about 100% of said maximum voltage.

13. A method according to claim 1, characterized in that it is carried out substantially continuously during at least a procedure of stopping said asynchronous motor until the voltage across said motor has at least been reduced to be below a predetermined value of the maximum voltage across the motor, selected from a range of about 50% to about 30% thereof.

14. An apparatus for reducing the influence of a DC component in a load current of an asynchronous three-phase motor, said motor being associated with an arrangement for controlling the voltage of two of the three phases by adjusting firing angles of semiconductor devices of the type turning off at zero-crossing of the current therethrough, two connected in anti-parallel to each other in each phase, characterized in that the apparatus comprises for each said controlled phase:

means for detecting the turn-off time of a first of said semiconductor devices and the subsequent turn-off time of the other, second semiconductor device, means for determining the time period, called second time period, of the current half-cycle of said second semiconductor device as the difference between said turn-off times, means for calculating, based upon information about said second time period, a value of a change of firing angle of said first and/or second semiconductor device needed for changing the length of said second time period for compensating for the influence of any DC component of the current through this semiconductor device thereupon, and means for determining the firing angle of said first and/or second semiconductor device in dependence of the result of said calculation for reducing the influence of a possible DC component in the current by a corresponding control through said arrangement.

15. An apparatus according to claim 14, characterized in that said calculating means is adapted to compare said second time period with half the time period of the voltage in said phase and to calculate the change of the firing angle of said first and/or second semiconductor device needed for removing any difference between said second time period and said half time period of the voltage.

16. An apparatus according to claim 14, characterized in that said detecting means is adapted to detect the turn-off time of said first semiconductor device subsequent to a detection of the turn-off time of said second semiconductor device, that said time period determining means is adapted to determine a time period, called first time period, of the current half-cycle of said first semiconductor device as the difference between the turn-off times last mentioned, and that said calculation means is adapted to compare said first and second time periods and calculate the change of the firing angle of said first and/or second semiconductor device needed for removing the difference between said first and second time periods.

17. An apparatus according claim 15, characterized in that said detecting means is adapted to detect the turn-off time of said first semiconductor device subsequent to a detection of the turn-off time of said second semiconductor device, that said time period determining means is adapted to determine the time period, called first time period, of the current half-cycle of said first semiconductor device as the difference between the two turn-off times last mentioned, and that said calculating means is adapted to use the sum of said first and second time periods as a value of said half the time period of the voltage in said phase.

18. An apparatus according to claim 14, characterized in that said firing angle determining means is adapted to determine said firing angle to be changed by only a portion of said value of the change of the firing angle needed calculated by said calculating means for stepwise reducing the influence of any DC component of the current.

19. An apparatus according to claim 14, characterized in that said detecting means, time period determining means and said calculating means are adapted to obtain a plurality of calculations of a said value of a change of firing angle needed, and that said firing angle determining means is adapted to determine said firing angle on the basis of at least two said calculations.

20. An apparatus according to claim 14, characterized in that it is adapted to reduce the influence of a DC component in a load current of an asynchronous three-phase motor substantially continuously at least during the start of said asynchronous motor until the voltage across the motor has reached a predetermined portion of the maximum voltage thereacross, selected from a range of about 80% to about 100% of said maximum voltage.

21. An apparatus according to claim 14, characterized in that in that it is adapted to reduce the influence of a DC component in a load current of an asynchronous three-phase motor substantially continuously during at least a procedure of stopping said asynchronous motor until the voltage across said motor has at least been reduced to be below a predetermined value of the maximum voltage across the motor, selected from a range of about 50% to about 30% thereof.

22. A system for reducing the influence of a DC component in a load current of an asynchronous three-phase motor according to the method of claim 1 comprising a computer having a memory, said computer including a computer program executing thereon for controlling the steps of claim 1.

23. The system according to claim 22 wherein said computer comprises a network connection.

24. The system according to claim 22 wherein said program is stored on a computer readable medium.

25. The system according to claim 23 wherein said network connection comprises the Internet.

\* \* \* \* \*